March 29, 1938. C. B. SAWYER Re. 20,680
Orig. 1,803,275

PIEZOELECTRIC DEVICE

Original Filed Nov. 3, 1930 3 Sheets-Sheet 1

Twistor

INVENTOR
C. B. Sawyer
BY Evans & McCoy
ATTORNEYS

Examin

March 29, 1938. C. B. SAWYER Re. 20,680

PIEZOELECTRIC DEVICE

Original Filed Nov. 3, 1930 3 Sheets-Sheet 2

INVENTOR
C. B. Sawyer
BY
Evans & McCoy
ATTORNEYS

Examine

March 29, 1938. C. B. SAWYER Re. 20,680

PIEZOELECTRIC DEVICE

Original Filed Nov. 3, 1930 3 Sheets-Sheet 3

INVENTOR
C. B. Sawyer
BY
Evans & McCoy
ATTORNEYS

Reissued Mar. 29, 1938 Re. 20,680

UNITED STATES PATENT OFFICE 20,680

PIEZOELECTRIC DEVICE

Charles B. Sawyer, Cleveland Heights, Ohio, assignor, by mesne assignments, to The Brush Development Company, Cleveland, Ohio, a corporation of Ohio Original No. 1,803,275, dated April 28, 1931, Serial No. 492,904, November 3, 1930. Application for reissue August 6, 1937, Serial No. 157,704

10 Claims. (Cl. 179—110)

This invention relates to a new and improved form of piezo-electric device for converting vibratory electrical energy into mechanical vibrations, or vice versa.

This application is a continuation in part of my application Serial No. 305,592, filed September 12, 1928.

The invention has for one of its objects the production of a loud speaking device capable of utilizing comparatively large amounts of energy and giving off a correspondingly large volume of sound with negligible distortion.

A further object of this invention is to provide a method of utilizing piezo-electric plates so that units may be designed having various electrical impedances.

Another object of this invention is to utilize piezo-electric plates of such shape that they can be efficiently cut from the original crystal of piezo-electric material.

A further object of this invention is to provide a method of arranging and mounting these plates so that the consequences of temperature changes will be minimized or eliminated.

Another object of this invention is to arrange plates cut from a crystal of piezo-electric material, such as Rochelle salt, in such a manner as to take advantage of the fact that such plates have greater strength in one direction in resistance to mechanical and electrical shocks.

A further object of this invention is to secure a resultant movement larger than the physical movement of the crystalline plates per se under electrical stress so that a large motion may be obtained, which motion may or may not be mechanically magnified to produce the desired result.

Another object of this invention is to provide a device which will be free from extraneous noises and rattles.

In this invention I have provided a method of efficiently utilizing sufficiently large volumes of the piezo-electric material to convert a considerable amount of electrical energy into sound energy and give a faithful sound reproduction. The efficiency of transformation is also very high even at very weak impressed voltages.

The amount of energy that a given volume of piezo-electric material will handle is limited not only by the breaking point of the material under electrical stress at excessive voltage, but also in the case of crystalline material of the Rochelle salt type by the fact that there is a limiting or saturation point beyond which the response of the crystal is no longer approximately proportional to the voltage applied.

In this invention the arrangement of the crystalline material is such that even with only a comparatively small voltage available a potential gradient of the desired magnitude may be secured throughout a large amount of crystalline material. Furthermore, the gradient is uniform throughout the mass, thereby utilizing the material efficiently and eliminating spots of high stress with the consequent liability to puncture, or to become saturated locally, which has a tendency to cause distortion.

Other advantages will be apparent from the following description and annexed drawings, in which Figure 1 is a plan view of the assembled apparatus embodying my invention;

Figure 7:
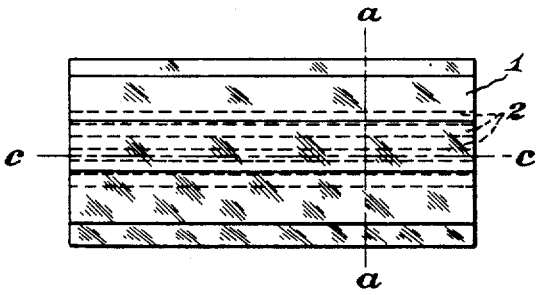
Figs. 7 and 8 are side and end elevations of a Rochelle salt crystal showing in dotted lines the way in which the crystalline plates may be cut from the crystal.
Figure 8:
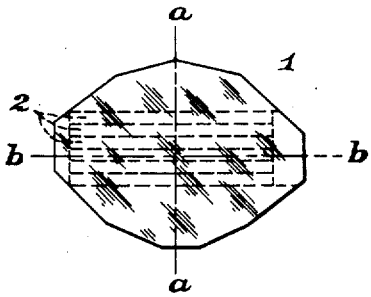

An entire Rochelle salt crystal 1 is indicated in Figs. 7 and 8, and the majar longitudinal axis is indicated on the line *c*—*c*, the major transverse axis on the line *b*—*b*, and the minor axis on the line *a*—*a*, which is also the electrical axis of the crystal.

As indicated in dotted lines in Figs. 7 and 8, plates 2 may be cut from the crystal 1 with the extended plane surfaces substantially perpendicular to the electrical axis, and when the plates 2 are so cut from a Rochelle salt crystal, the directions of expansion and contraction of the plate when subjected to an electric field are at substantially 45 degrees to the major longitudinal axis.

Figure 9:
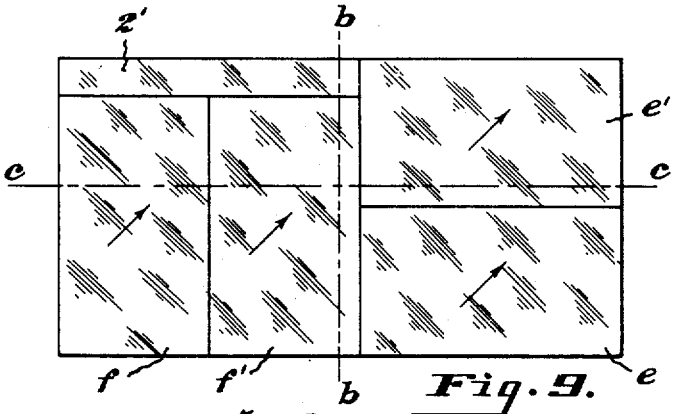
Fig. 9 is a view showing a method of cutting crystalline plates from a slab of crystal.

Another method of cutting plates from a Rochelle salt crystal is to cut the slab 2', shown in Fig. 9, from the crystal in the same manner that plates 2 are cut from the crystal shown in Figs. 7 and 8, and then subdivide the slab 2' so as to obtain plates *e*, *e'*, with the longitudinal dimension parallel to the major longitudinal axis of the crystal, and the plates *f*, *f'* with the longitudinal dimension parallel to the major transverse axis of the crystal.

The slab 2' may be subdivided so that all of the plates have a longitudinal dimension parallel to the *b*-axis of the slab, such as plates *f*, *f'*, or so that all of the plates have the longitudinal dimension parallel to the *c*-axis of the slab 2', such as plates *e*, *e'* or, as shown in Fig. 9, part of the plates may be cut with their longitudinal axis parallel to the *b*-axis and part parallel to the *c*-axis.

When the plates are cut from the crystal in any of the ways indicated above and subjected to an electrostatic field in the direction of the electric axis, the plates will expand on lines parallel to their faces at an angle of substantially 45 degrees to the *c*-axis and will simultaneously contract along lines parallel to their faces and at substantially 90 degrees to the lines of expansion. Thus if an *e* plate and an *f* plate are arranged with their longitudinal axes parallel and subjected to electrostatic fields in the same direction, the expansion of each plate will take place on lines parallel to the contraction of the other plate, and when the direction of the electrostatic fields is reversed, the plates will contract on the lines on which they formerly expanded, and vice versa.

Figure 1:
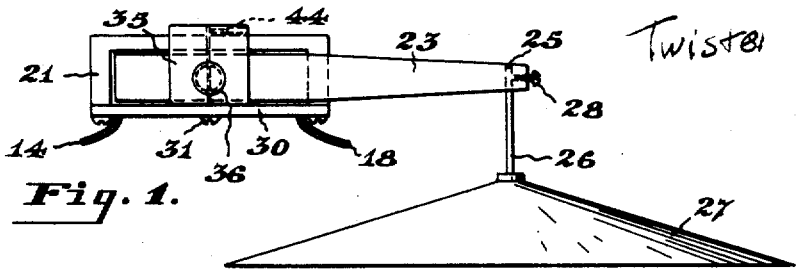
Figure 2:
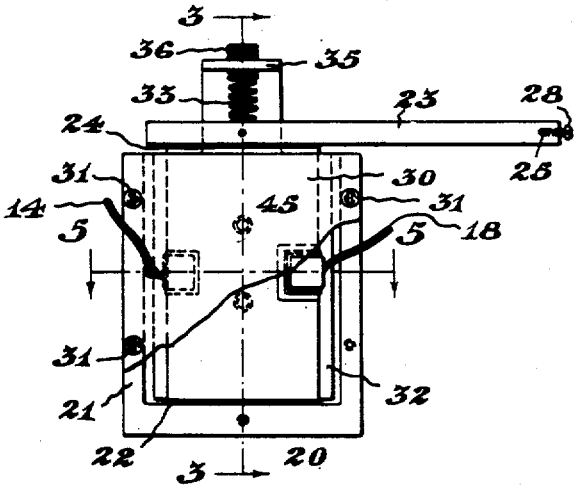
Fig. 2 is a front elevation, partly in section, of the apparatus in Fig. 1 with the sound reproducing diaphragm removed.

It has been found that when the plates have the *b*-axis rather than the *c*-axis disposed longitudinally thereof, that is, parallel to the axis of the twisting of the plates hereinafter described, the plates have much greater strength and resistance to mechanical and electrical shocks. It is therefore preferable, in assembling plates in units designed to undergo severe service, to have the plates so arranged that the *b*-axes are disposed parallel to the twisting axis of the plates, and in the structure shown in Figs. 2 and 3 this would be parallel to the greatest longitudinal dimension of the plates, and they would be mounted with the longitudinal dimension of the plates and the twisting axis of the plates coinciding. On the other hand, it is to be observed that when the crystalline plates of the piezoelectric element are formed with their length parallel to the *c*-axis, it is possible with a given size of crystal of the form usually employed to secure larger plates than is possible if the plates have their length parallel to the *b*-axis or are formed in the manner described in my Patent Reissue No. 20,213. For some applications of the invention this is an important consideration.

The plates 2 (or *e* or *f*) are preferably of rectangular form as shown, since this is a convenient shape to cut from the crystal, but it will be noticed that the device will be operable if the plates are of irregular shape.

Figure 10:
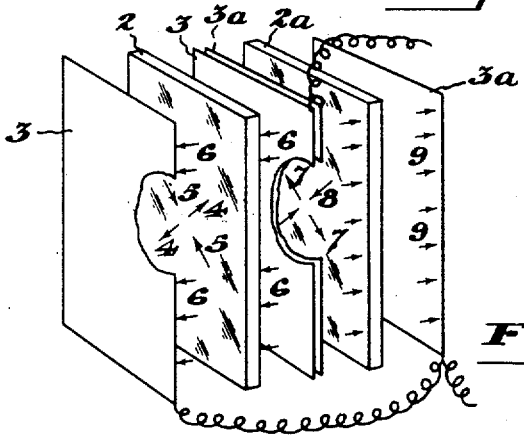
Fig. 10 is an exploded view of the crystalline element showing the manner of assembly with the electrodes.

A method of assembling the crystalline plates to form the element shown in Figs. 1 to 5 is indicated in Fig. 10 where two similar crystalline plates, formed as shown in Figs. 7 and 8 or as shown in Fig. 9 by plates *f*, *f'* or by plates *e*, *e'*, are designated 2 and 2ᵃ and are provided with electrodes 3 and 3ᵃ, the electrodes 3 being applied to both sides of the plate 2 and the electrodes 3ᵃ being applied to both sides of the plate 2ᵃ. The adjacent electrodes 3, 3ᵃ are in electrical contact and provided with a single lead, and the outer electrodes 3, 3ᵃ are in electrical contact and provided with another lead.

In Fig. 10 the arrows 4, 5 indicate the direction of expansion and contraction, respectively, of the plate 2 when the electrical field is in the direction indicated by the arrows 6, and the arrows 7 and 8 indicate the direction of expansion and contraction of the plate 2ᵃ when the electrical field is in the direction of the arrows 9. In such an assembly the directions of expansion and contraction of one plate are respectively opposed to the directions of contraction and expansion of the other plate when the corresponding major crystalline axes of the two plates are parallel.

Figure 11:
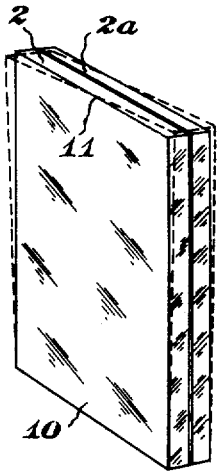
Fig. 11 is a perspective view showing in dotted lines the magnified movement of the free edge portions of the crystalline element.

When the plates 2 and 2ᵃ are connected together in close contact with each other and subjected to electrostatic fields as in Fig. 10, the plate 2 tends to contract along the same lines that the plate 2ᵃ tends to expand and the plate 2 tends to expand along the same lines as the plate 2ᵃ tends to contract, so that, because of the mutual constraint of the plates, the assembled element twists about its central longitudinal axis and, if the lower edge 10 of the plates when secured together is held in any suitable manner, the upper portion 11 of the plates tends to have the movement indicated diagrammatically in Fig. 11. The electrodes are not shown in Fig. 11, as they would tend to be confusing with the dotted lines showing the lines of movement of the upper portion of the plates 2, 2ᵃ.

Figure 12:
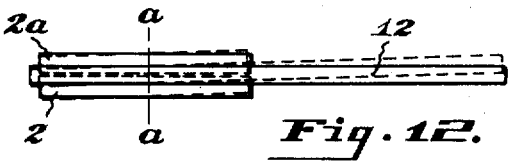
Fig. 12 is a diagrammatic view showing the movement of the crystalline element as viewed from above, together with the movement of the actuating arm, these movements being greatly magnified.

It will thus be seen that when the actuating arm 12 is secured to the upper portion of both of the plates 2, 2ᵃ it will be actuated in one direction as indicated diagrammatically in Fig. 12, and upon reversal of the fields the arm 12 will move similarly in the opposite direction, although this movement is not shown in this figure for purposes of clarity.

The plates 2, 2ᵃ together with the electrodes 3, 3ᵃ may be secured together in any suitable manner. Preferably, the electrodes 3, 3ᵃ are of tinfoil and are cemented to the faces of the crystalline plates by Canada balsam or any other suitable cement, such as rosin, beeswax and the like. The plates 2, 2ᵃ, together with their electrodes, are preferably cemented together throughout their adjacent surfaces and along their edges, by the use of any suitable cement.

The external electrodes 3, 3ᵃ may be electrically connected together in any suitable manner, such as by the clip 13 to which is connected a suitable electrical lead 14. A piece of metallic gauze 15 may be used between the clip and the electrodes, if desired.

Similarly, the internal electrodes 3, 3ᵃ may be brought out over the edge portions of the plates 2, 2ᵃ and separated from contact with the external electrodes 3, 3ᵃ by any suitable insulating material 16, such as bakelite, hard rubber or the like. These electrodes are in turn held in electrical contact by a metallic clip 17 to which is connected the lead 18, and metallic gauze 19 may be interposed between the electrodes and the clip if desired. The purpose of this gauze is to provide a good electrical contact with the clips without the liability to abrade or tear the surfaces of the fragile tinfoil electrodes.

In order to hold one edge portion of the assembled plates 2, 2a of the piezo-electric material against movement, the assembly is preferably secured to the base 20 of a suitable frame or case 21. The crystalline element is secured to the base 20 by any suitable cement 22, such as asphalt, metallic amalgam or the like. A cement of high viscosity material is preferable.

Actuating arm 23 is secured to the upper portion of the crystalline plates 2, 2a by any suitable cement, such as an asphalt cement 24. At the outer end of the actuating arm 23 is a suitable aperture 25 which is adapted to receive a connecting rod 26 to which the cone or other loud speaker diaphragm 27 may be secured. The rod 26 may be held in the arm 23 by any suitable means, such as the set screw 28.

The crystalline speaker element may be held in the case 21 and protected from mechanical shocks by a cover 30 which may be secured to the case by any suitable means, such as the screws 31. Preferably sponge rubber pads 32 are disposed between the crystalline element and the cover 30, and these pads protect the crystalline element from mechanical shocks and jars, and at the same time form a cushion during normal operation of the speaker. An important function of the sponge rubber is that it presses the metallic electrodes firmly on the surfaces of the plates at all times and also presses the plates firmly together, counteracting any tendency for the adhesive material to loosen under vibration. It is also an aid to obtaining alignment of the element during assembly.

Figure 3:
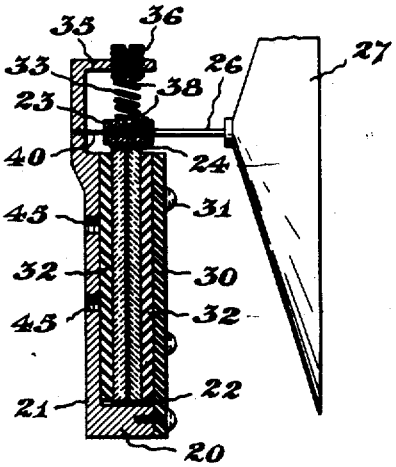
Fig. 3 is a section taken on line 3—3, of Fig. 2, and showing the sound reproducing diaphragm.
Figure 5:
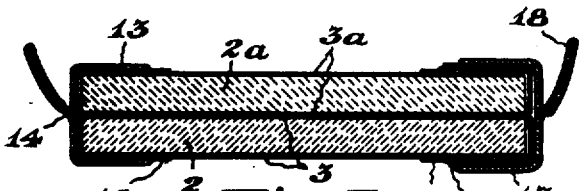
Fig. 5 is a section through the crystalline element on the line 5—5 of Fig. 2, the casing being omitted.
Figure 4:
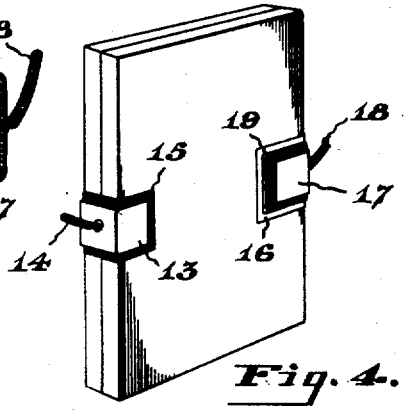
Fig. 4 is an isometric view of the crystalline element before assembly in the frame.

In order to hold the actuating arm 23 firmly against the crystalline element and to hold the crystalline element firmly against the base 20 of the case, a spring 33 is preferably provided, thereby eliminating pivots and similar devices which give rise to mechanical rattles while the speaker is in operation. In order to mount the spring between the frame or case and the crystalline element, the frame 21 is provided with an extension 35 which overlies the actuating arm 23. The extension 35 is suitably apertured to receive an adjustable screw 36. Suitable guide pins 38 are provided on the actuating arm 23 and the adjustable screw 36 for the purpose of holding the spring 33 in operative position, as shown in Fig. 3. The compression of the spring 33 may obviously be adjusted by the screw 36.

Figure 6:
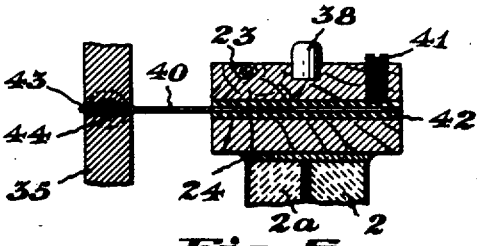
Fig. 6 is an enlarged fragmentary section of the top portion of the crystalline element and actuating arm shown in Fig. 3.

In order to prevent the crystalline element from yielding to the force produced by the reaction of the acoustical diaphragm when it is being vibrated by the movement of the actuating arm 23, I have provided a reactor means to permit the arm 23 to turn about the central longitudinal axis of the unit, but at the same time preventing movement of the unit bodily laterally toward or from the back of the casing 21. The reactor rod 40 is preferably clamped to the actuating arm 23, as shown in Fig. 6, by means of the set screw 41, there being provided a small rubber sleeve 42 around the rod 40 to prevent metallic contact between the screw 41 and the rod, thereby preventing any metallic contact which would tend to produce mechanical noises in the speaker.

The reactor rod 40 is rigidly held in the aperture 43 in the extension 35 of the casing by any suitable means, such as a set screw 44. The reactor rod 40 is preferably made of a resilient metal, such as piano wire or spring steel, so that it will permit bending upon movement of the actuating arm 23, and will be very resistant to motion in compression or tension so as to prevent the reactionary forces of the acoustic diaphragm from pushing the piezo-electric element laterally.

The crystalline element is preferably mounted upon warm asphalt 22 on the bottom 20 of the case 21, and the arm 23 is mounted upon warm asphalt 24 upon the top portions of the crystalline plates 2, 2a. Suitable pressure is applied by means of the spring 33 upon the arm 23, which causes the asphalt to flow and fill up any irregularities in the ends of the crystalline element, so that a very firm seat will be formed for both the top portion 11 and the bottom portion 10 of the crystalline element. This seat really acts as a matrix, giving the crystalline element a high resistance to turning movements, so that the full movement of the crystalline plates 2, 2a in response to the electrostatic field is utilized to move the arm 23.

After the crystalline element has become firmly set in the case, the screw 44 is tightened to firmly hold the reactor rod 40 to prevent lateral movement of the crystalline element, as explained above.

Suitable threaded apertures 45 may be provided in the casing 21 to enable the casing to be secured to any suitable support.

In assembling plates for use as shown in Fig. 10, the plates should be plates having their *b*-crystalline axes and their *c*-crystalline axes parallel to each other, as shown in Figs. 7 and 8, or else they should be both *e* plates or both *f* plates, of the types shown in Fig. 9.

In general, if internal electrodes are made of opposite potential to external electrodes, the plates should have their longitudinal dimensions parallel to the same major crystalline axis if a resultant twisting motion is desired.

A twisting motion may also be obtained by the use of plates having their major crystalline axes perpendicular to each other, that is, by the use of an *e*-type plate and an *f*-type plate in combination. In the latter case, in order to place the plates in opposed electrostatic relationship, they may be assembled without an internal electrode, as shown in Fig. 14, or with an internal electrode or a plate of conducting material, but in this case the internal electrode is not made of opposite polarity to the external electrode, as shown in Fig. 10, but the two outside plates are of opposite polarity, as shown in Fig. 14.

Figure 14:
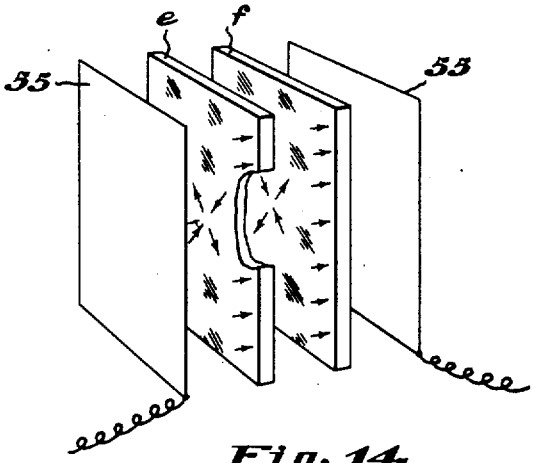
Fig. 14 is a view similar to Fig. 10 showing another modified method of assembly.

It is obvious that if a pair of plates *e* and *f* are mounted together without an internal electrode, as shown in Fig. 14, but with their *c*-axes in parallel planes and at right angles to each other, a twisting motion of the cemented plates will be produced if the electric field is passed through the pair of plates in the same direction. Electrodes 55, therefore, will be required only upon the outside surfaces of such a pair of cemented plates. This arrangement produces a structure with substantially the same kind of movement of the plates, under the influence of an electrostatic field, as when the *c*-axes are in parallel planes and parallel to each other with an electrode between the plates.

In the arrangement described above, it will be noted that metallic conducting plates may be disposed on the opposed inner surfaces of the pair of plates *e* and *f* to reduce the surface impedance of the crystalline plates, and thus facilitate the action of the applied electromotive force in setting up a field in the dielectric. In this case such metallic conducting plates are placed in electrical contact with each other when the crystalline plates are secured together.

It will be seen that the plates 2, 2ᵃ shown in Fig. 11 may therefore be cut directly from whole crystals or from portions of crystals in the manner shown in Figs. 7 and 8, or, if the crystal be sufficiently large, the plates 2, 2ᵃ may be cut from a single plate 2' cut from a large crystal, as shown in Fig. 9, and the plates 2, 2ᵃ may therefore be composed of plates cut in the same manner as the plates *e* and *f*.

Furthermore, it will be noted that the plates 2, 2ᵃ used in the device illustrated in Fig. 11 may be from different crystals or portions of crystals or from the same crystal, since the operation of the device depends upon the orientation of the planes and edges of the plates relative to the crystalline axes and the arrangement of the plates relative to each other.

It will therefore be seen that the plates 2, 2ᵃ should be cut from the crystal or from a plate cut in predetermined relationship with respect to the crystalline axes in accordance with the results desired. If it be desired to have the combined plates of maximum strength for a given thickness, to resist mechanical and electrical shocks, the plates 2, 2ᵃ should be cut with the *b*-axis disposed longitudinally thereof—that is, parallel to the axis of the twisting of the plates. If it be desired to form the plates 2, 2ᵃ from a single crystal they are preferably cut with the *c*-axis disposed longitudinally thereof.

Figure 13:
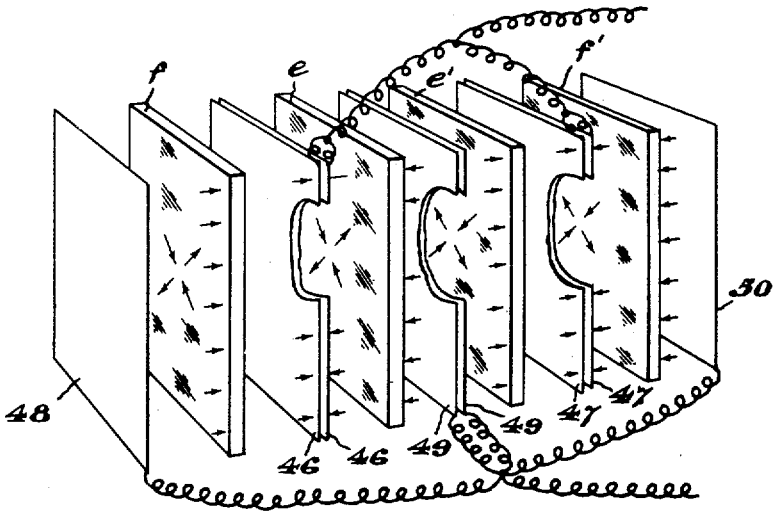
Fig. 13 is an exploded view showing a modified method of assembling the crystalline plates and electrodes.

Piezo-electric devices embodying my invention may be constructed with more than two plates. Fig. 13 is an exploded view of a four-plate element. When plates *e* and *f* are disposed adjacent to each other with suitable electrodes so that the major longitudinal crystalline axis *c*—*c* of the plate *e* is parallel to the major transverse crystalline axis *b*—*b* of the plate *f*, the plates *e* and *f* will expand and contract in the same direction when the electrostatic fields are in the opposite direction through these plates, as will be seen from Fig. 13. The plates *e* and *f* are disposed adjacent each other with the electrodes 46 between them, and similarly the plates *e'* and *f'* are disposed adjacent each other with the electrodes 47 between them, and all of the electrodes 46 and 47 are connected by a common lead. Other electrodes 48, 49 and 50 are disposed respectively outside the plate *f*, between the plates *e*, *e'*, and outside the plate *f'*, and connected by a common lead. In this manner opposite electric fields are disposed to pass through the plates *e*, *f* and *e'*, *f'*, respectively, and the plates *e*, *f* will act together and in opposition to the plates *e'*, *f'*, which act together.

This arrangement has the advantage that in case a large volume of electrical energy is to be transformed, more crystalline material may be efficiently used than with a two plate unit. Also, with double the number of plates, the area of the electrodes is doubled, and therefore the electrostatic capacity is increased, whereby for a given frequency, a unit is obtained with much lower impedance than a unit having only one pair of plates. Furthermore, if it be desired to keep down the thickness of the unit in order to obtain a high torsional flexibility, plates of half the thickness may be used, and a correspondingly reduced electrical impedance results.

It is to be understood, of course, that the plates shown in the exploded view in Fig. 13 may be assembled on a suitable base, and a suitable actuating arm similar to the arm 23 provided to which a cone or other loud speaker diaphragm may be secured.

It will be seen that in my improved piezo-electric elements expanding and contracting movements of the component crystalline plates are combined and converted into the larger corresponding movement of the element and that the latter enlarged movement is a torsional or twisting movement which is adapted readily to be further magnified, as by the simple expedient of the directly connected extension arm which has been described.

While I have shown the crystalline plates as rectangular in form it is obvious that they may be square or of irregular shape, as long as they are secured together to obtain a twisting of the plates at right angles to the surfaces thereof.

It may be noted that while it is preferable to cut the crystalline plates from a clear Rochelle salt crystal with the plane surfaces substantially perpendicular to the electrical axis, these plates may be cut at angles less than 90 degrees to the electrical axis and the plates so cut may be combined to form operative devices.

In carrying out this invention it is advantageous to utilize plates which are substantially homogeneous and uniformly crystalline throughout, and these plates may be readily obtained from clear Rochelle salt crystals which are substantially free from mother liquor or other inclusions.

It will be seen that by cementing the plates together throughout their juxtaposed surfaces a more rigid construction is obtained. In some cases, however, it may not be necessary to cement them through their juxtaposed surfaces, and in this case the plates may be cemented around the marginal portions of their surfaces and also along the edges, if desired, or they may be cemented together only around their edges.

Whether or not internal electrodes be present, the surfaces of the plates may be rigidly secured to each other by cementing them, as the internal electrodes, when used, are preferably secured intimately to one or both of the surfaces of the juxtaposed plates, as the case may be, prior to the assembly of the elements. The cementing together of the elements of the assembly is of advantage in that it makes the assembly more rigid and causes the plates to act in unison.

It will also be seen that I have provided an apparatus for efficiently utilizing a sufficiently large volume of piezo-electric material to convert a relatively large amount of energy into sound energy with a true reproduction of the electrical impulses as sound waves, and have also greatly increased the efficiency of the transformation at both high and low impressed voltages and frequencies.

It will be very apparent that I have eliminated all mechanical pivots or joints, which tend to cause rattles and extraneous noises in the speaker.

It will be further noticed that owing to the comparatively large extent of the surface area of the plates, and also due to the fact that the electrodes, in the preferred form of construction, are connected in parallel, the effective capacity of the speaker is quite high, resulting in a low impedance at ordinary acoustic frequencies, which greatly facilitates the adaptation of this speaker for use with vacuum tubes of the characteristics at present on the market.

It will also be seen that the reactor rod 40 increases the transmission of bass notes to the loud speaker because notes of high amplitude and low frequency would tend to cause bodily lateral movement of the upper edge portion of the plates due to the reactance of the acoustic diaphragm, whereas vibrations of high frequency and low amplitude are not so effective in producing lateral displacement owing to the increased inertia effect at high frequencies of the top portion of the plates.

While this invention has been described in connection with the operation of a sound reproducing diaphragm, it is also to be understood that the piezo-electric device herein disclosed is capable of acting reversely, that is, to translate sound waves or other impulses causing mechanical vibration into electrical impulses. In other words, the arrangement of the piezo-electric crystalline plates is such that they are in opposed electrostatic relation so that if sounds are received on a diaphragm, or if the plates are otherwise caused to twist mechanically, electrical impulses will be generated by twisting the plates herein disclosed. Such electrical impulses may, of course, be amplified by suitable electronic devices well known to the art. The vibrations produced by twisting of the plate assembly upon the application of an electromotive force to the device may be used for other purposes, such as the actuation of a stylus for cutting phonograph records or for applying pressure to suitable receiving devices.

It will thus be seen that, since the plates are mounted in opposed electrostatic relation, electric impulses may be generated by a twisting of the plates, and twisting of the plates may be obtained upon the application of a suitable electrostatic field.

Furthermore, it is to be understood that the particular forms of apparatus shown and described, and the particular procedure set forth, are presented for purposes of explanation and illustration, and that various modifications of said apparatus and procedure can be made without departing from my invention as defined in the appended claims.

What I claim is:

1. In a piezo-electric device, the combination of a piezo-electric element comprising a plurality of plates of homogeneous piezo-electric material, each plate having a face substantially at right angles to the electrical axis of the material and being adapted simultaneously to expand and contract on lines parallel to its said face and at right angles to each other and substantially at 45 degrees to one of its major dimensions under the action of an electrostatic field perpendicular to its face and the said plates being disposed face to face and connected together so that under the action of said electrostatic fields the said simultaneous expansion and contraction of one plate effectively opposes the simultaneous contraction and expansion, respectively, of another plate, whereby a twisting motion is imparted to the element, electrode means associated with faces of said plates for establishing such an electrostatic field in each of said plates, a base adapted to hold an edge portion of the element fixed adjacent one end of the axis of twisting, and an actuating arm secured to the free edge portion of the element.

2. In a piezo-electric device, the combination of a piezo-electric element comprising a plurality of plates of homogeneous piezo-electric material, each plate having a face substantially at right angles to the electrical axis of the material and being adapted simultaneously to expand and contract on lines parallel to its said face and at right angles to each other and substantially at 45 degrees to one of its major dimensions under the action of an electrostatic field perpendicular to its face and the plates being disposed face to face with their mutually adjacent surfaces mechanically connected together substantially throughout their areas so that, under the action of said electrostatic fields, the simultaneous expansion and contraction of one plate effectively opposes the simultaneous contraction and expansion, respectively, of another plate, whereby a twisting motion is imparted to the element, electrode means associated with faces of said plates for establishing such an electrostatic field in each of said plates, a base adapted to hold an edge portion of the element fixed adjacent one end of the axis of twisting, and an actuating arm secured to the free edge portion of the element.

3. In a piezo-electric device, the combination with an acoustic diaphragm of a piezo-electric element comprising a plurality of plates of homogeneous piezo-electric material, each plate having a face substantially at right angles to the electrical axis of the material and being adapted simultaneously to expand and contract on lines parallel to its said face and at right angles to each other and substantially at 45 degrees to one of its major dimensions under the action of an electrostatic field perpendicular to its face and the plates being disposed face to face with their adjacent surfaces mechanically connected together so that, under the action of said electrostatic fields, the simultaneous expansion and contraction of one plate effectively opposes the simultaneous contraction and expansion, respectively, of another plate, whereby a twisting motion is imparted to the element, electrode means associated with faces of said plates for establishing such an electrostatic field in each of said plates, a base adapted to hold an edge portion of the element fixed adjacent one end of the axis of twisting, an arm secured to the free edge of the element to actuate said diaphragm in a direction transverse to the faces of the piezo-electric element, and flexible means connected to said free edge of the element for opposing lateral bodily movement of the free edge portion of the element without preventing the twisting movement of the element.

4. In a piezo-electric device having a plurality of plates of piezo-electric material secured to each other and being disposed to expand and contract in opposition to each other when influenced by an electrostatic field and thereby produce a twisting motion, a base member for holding one edge portion against vibrational movement, an actuating arm mounted on the opposite edge portion to be vibrated by said twisting of the plates, a flexible reactor rod extending through said actuating arm perpendicular to the twisting axis of said plates, a screw for holding said rod in said arm, and means for insulating said rod from said screw, said reactor rod being adapted to permit twisting of said plates and to prevent bodily lateral movement of the upper edge portions thereof.

5. In a piezo-electric device, the combination of a plurality of plates of piezo-electric material having substantially the piezo-electric characteristics of Rochelle salt, each of said plates having its faces substantially parallel and being so formed relative to the crystalline axes that upon the application of an electrostatic field at right angles to its faces simultaneous expansion and contraction of the plate will take place on lines substantially parallel to its faces and at right angles to each other and at substantially 45 degrees to a major dimension of the plate, and the said plates being so disposed and mounted relative to each other that the simultaneous expansion and contraction of the crystalline material on one side of the median plane of the assembly parallel to its plates are opposed to the simultaneous contraction and expansion respectively of the crystalline material on the other side of said plane, whereby a twisting motion of the assembly is effected, or vice versa.

6. The combination set forth in claim 5, in which the plates of piezo-electric material have their *c*-crystalline axes parallel to each other.

7. The combination set forth in claim 5, in which the assembly comprises a pair of plates of piezo-electric material which have their *c*-crystalline axes perpendicular to each other, the plates having their inner surfaces secured together, and electrodes disposed on the outer surfaces of the plates for applying electromotive force thereto.

8. The combination set forth in claim 5, in which two pairs of plates are secured together in assembly, the plates of each pair having their *c*-crystalline axes disposed perpendicular to each other and the inner plates of the assembly having their *c*-crystalline axes parallel to each other, and means for applying an electrostatic field to cause simultaneous expansion in one direction of one of said pairs of plates and simultaneous contraction in the same direction of the other pair of plates.

9. In a piezo-electric device, the combination of a plurality of plates of piezo-electric material having substantially the piezo-electric characteristics of Rochelle salt, each of said plates having its faces substantially parallel and being so formed relative to the crystalline axes that upon the application of an electrostatic field at right angles to its faces simultaneous expansion and contraction of the plate will take place on lines substantially parallel to its faces and at right angles to each other and substantially 45 degrees to a major dimension of the plate, the plates being juxtaposed face to face and comprising two groups with the adjacent plates of each group having their *c* axes at right angles to each other and with the plate of one group and the plate of the other group which are mutually adjacent having their *c* axes parallel, electrodes between the surfaces of adjacent plates and on the outer plate surfaces of the assembly, the alternate electrodes of the assembly being connected together in two groups of opposite polarity, whereby electric impedance of the device is made low and a group of adjacent plates acts as a unit on a juxtaposed unit of adjacent plates to produce a twisting action of the whole assembly.

10. A piezo-electric device comprising in combination a pair of plates of homogeneous piezo-electric material of substantially uniform thickness, each plate having the property of simultaneously expanding and contracting in directions parallel to its plane and at right angles to each other and substantially 45 degrees to one of its major dimensions, said plates being mechanically connected together face to face and in opposed electrostatic relation to each other with the expanding portion of one of the plates juxtaposed against the contracting portion of the adjacent plate, whereby upon the application of electrostatic fields a twisting of the plates is obtained, or upon twisting of the plates electrostatic fields are generated therein.

CHARLES B. SAWYER.